(12) United States Patent
Laustsen et al.

(10) Patent No.: US 7,988,282 B2
(45) Date of Patent: Aug. 2, 2011

(54) SPECTACLE FRAME

(75) Inventors: Karsten Laustsen, Hojbjerg (DK);
Claus Bellinger Diederichsen, Ega (DK); Jens Vestermark Pind, Horning (DK)

(73) Assignee: Bellinger A/S (DK)

( * ) Notice: Subject to any disclaimer, the term of this patent is extended or adjusted under 35 U.S.C. 154(b) by 0 days.

(21) Appl. No.: 12/738,719

(22) PCT Filed: Oct. 6, 2008

(86) PCT No.: PCT/DK2008/000346
§ 371 (c)(1),
(2), (4) Date: Jun. 8, 2010

(87) PCT Pub. No.: WO2009/049621
PCT Pub. Date: Apr. 23, 2009

(65) Prior Publication Data
US 2010/0238395 A1    Sep. 23, 2010

(30) Foreign Application Priority Data

Oct. 18, 2007 (EP) .................................. 07020408

(51) Int. Cl.
*G02C 5/18* (2006.01)

(52) U.S. Cl. ........................... 351/117; 351/41; 351/111

(58) Field of Classification Search .................. 351/117, 351/156, 157, 111, 121, 122, 123, 118, 119, 351/41, 158
See application file for complete search history.

(56) References Cited

U.S. PATENT DOCUMENTS

| 3,582,193 | A | * | 6/1971 | Bogyos ........................... 351/90 |
| 4,222,640 | A |   | 9/1980 | Bononi |
| 4,988,479 | A |   | 1/1991 | Nishikwawa |
| 2003/0020866 | A1 |   | 1/2003 | Asano |
| 2007/0002271 | A1 |   | 1/2007 | Rancan |
| 2009/0015784 | A1 | * | 1/2009 | Van Atta et al. .............. 351/116 |

FOREIGN PATENT DOCUMENTS

| EP | 0332540 A1 | 9/1989 |
| EP | 0 332 540 | * 10/1989 |
| FR | 1399533 A | 5/1965 |
| FR | 2563637 A1 | 10/1985 |
| FR | 2785058 A1 | 4/2000 |
| GB | 1074013 | 6/1967 |
| GB | 1378683 | 12/1974 |
| JP | 61233717 | 10/1986 |

OTHER PUBLICATIONS

International Search Report PCT/DK2008/00346; Dated Dec. 1, 2008.

* cited by examiner

*Primary Examiner* — Hung X Dang
(74) *Attorney, Agent, or Firm* — Cantor Colburn LLP

(57) ABSTRACT

A spectacle frame including at least one member, having a metal core part and a moulded part, the metal core part is an interior part of the at least one member and the moulded part is a composite material part comprising a material having a matrix material and reinforcement material embedded in the matrix material, whereby a spectacle frame or a member of a spectacle frame can be manufactured using composite materials while still allowing the frame or the member to be adjusted, and whereby the frame or the member can readily be shaped, adjusted as regards the curvature etc. by forcing the member to take the desired shape, and the metal core part will counteract the composite materials natural tendency to return to the initial shape, whereby the frame or the member will remain in the desired shape.

11 Claims, 6 Drawing Sheets

SPECTACLE FRAME

TECHNICAL FIELD

The invention relates to a spectacle frame comprising at least one member, which at least one member comprises a moulded part.

BACKGROUND

Spectacles and parts of spectacles have in the past been manufactured using a wide variety of materials and manufacturing methods. In particular, spectacles have been made from metal and from a wide variety of plastic materials, e.g. thermoplastic resins.

Spectacles and parts of spectacles made from metals and plastic materials have the advantage that the shape can be adjusted, possibly after having added heat, for example in order to adapt the shape, curvature, etc. of the spectacle frame to the glasses or in order to adapt the spectacle frame to the user.

When manufacturing spectacle frames, a number of aspects have to be taken into consideration, including the weight of the frame due to e.g. user comfort when wearing the spectacles, the rigidity and toughness of the spectacles and parts of spectacles, etc.

Furthermore, the manufacturing cost is an aspect that has to be taken into consideration. Even further, the options for designing spectacle frames are of significant importance when manufacturing spectacle frames, since customer preferences are vital for the commercial success of the spectacle frames. Thus, flexibility in the manufacturing process is desirable as are the options for providing spectacle frames having a customer appealing appearance.

JP 61-233717 discloses a spectacle frame composed of composite reinforced resin, where a thermoplastic matrix resin is used and where the reinforcing material comprises short carbon fibres and SiC whiskers.

EP 0 332 540 A1 discloses a rigid composite structure, in particular for a spectacle frame, where a number of layers are used around a core and wherein a thermoplastic material is used as a matrix material. The core as well as the layers comprise material such as carbon, glass, aramid, etc.

A common problem, though, with components made of composite materials relates to the adjustment or adaptation of the components, for example when used for spectacle frames, where it normally will be necessary or desirable to adjust the shape and/or curvature of e.g. rim parts and browbars to the specific lenses and adjust the e.g. browbar and/or side members to the user. The method used when plastic materials are used, i.e. application of heat and bending/adjusting the components can not be used when composite materials are used since the materials will break, delaminate, be subjected to fibre pull-out and/or decompose.

A further example of the wide variations in construction of spectacle frames is disclosed in U.S. Pat. No. 4,222,640, which relates to safety spectacles and where an inner frame made of hard plastic material commonly used for spectacles is embedded in a relatively thick layer of polyurethane foam. The polyurethane foam has a number of advantages including that it is easy to mould and that it has elastic properties allowing the corrective lenses to be inserted without difficulty. Further, the foam provides a comparatively soft mounting of the lenses. Thus, there is no need to adjust the shape of the frame due to e.g. the shape of the lenses and/or due to user preferences since the foam is elastic. According to an embodiment, a continuous metal wire is embedded in the inner frame made of hard plastic material in order to assure that the spectacles are still fitting if the inner frame has suffered a crack. According to another embodiment, the side pieces may have a metal core surrounded by the layer of polyurethane foam.

A still further example of a spectacle frame is disclosed in GB 1 378 683, which relates to a spectacle temple or side bar, which is made of a substantially rigid plastics material which is moulded around a reinforcing wire and where the rear portion may be formed to fit the user's ear while it is softened by the application of heat.

A still further example of a prior art spectacle frame is disclosed in FR 1 399 533 (corresponding to GB 1 074 013), which spectacle frame has a pair of side frames hingedly connected to the lens mount portion of the spectacle frame. Each of the side frames is composed of layers of thermoplastic materials, including a center layer, in which an axially extending reinforcement, e.g. a metal wire reinforcement, is disposed. The thermoplastic material of the center layer has a lower flow temperature than the outer layers. Thus, when the side frame is heated to a temperature, where material of the center layer, but not the outer layers, is softened, the reinforcement element can be forced into the side frame. According to a particular embodiment, the two outer layers are shaped to completely surround the center layer after assembly of the thermoplastic material layers. Thus, the center layer having the lower flow temperature is in the form of a core part, in which the reinforcement element will be embedded after having been forced longitudinally through the assembly of the thermoplastic material layers. The thermoplastic material used according to this prior art document is for example cellulose nitrate, cellulose butyrate or cellulose acetate.

Still further examples of prior art spectacle frames and frame parts are disclosed in US 2003/0020866 A1, US 2007/0002271 A1, U.S. Pat. No. 4,988,479 A, FR 2 563 637 A1 and FR 2 785 058 A1.

Of these, US 2003/0020866 A1 relates to an end piece for the temple or side frame of a spectacle frame, where the temple is made of metal and where the end piece comprises a thermoplastic end piece substrate and an end piece cover made of shape-memory plastic.

US 2007/0002271 A1 relates to a spectacle frame, where the temples or side frames each has a core made of an elastically deformable material such as titanium, stainless steel, etc, and where each temple comprises an outer coating having a rigidity substantially greater with respect to the core.

U.S. Pat. No. 4,988,479 A relates to a method for producing a multi-layered material having a base block and at least one surface layer, which material may be used for eyeglass frames. The base block may be made of titanium and the method comprises spraying at least one surface layer on the base block.

FR 2 563 637 A1 discloses a multi-layered material for spectacle frames, which material has an aluminum core and a cladding made of titanium.

FR 2 785 058 A1 discloses a spectacle frame, which comprises a metal wire frame and hinges, which metal wire frame is embedded in a moulded layer of plastic material.

BRIEF SUMMARY

The disclosure provides an improved spectacle frame and improved parts of such a spectacle frame.

In particular, the invention provides such a spectacle frame, which provides improvements as regards the strength and durability of the spectacle frame, while still allowing the spectacle frame or parts hereof to be relatively easily adjusted or adapted to e.g. the particular lenses used and/or to the individual wearer.

Furthermore, the invention provides such a spectacle frame, which provides an improved flexibility as regards manufacturing and design of spectacle frames.

The invention relates to a spectacle frame comprising at least one member, which at least one member comprises a metal core part and a moulded part, wherein said metal core part is an interior part of said at least one member and said moulded part comprises a composite material, wherein said composite material comprises a matrix material and reinforcement material embedded in said matrix material.

Thus, in accordance with the invention, the metal core part is embedded in the moulded part, and the moulded part comprises a matrix material, wherein reinforcement material in the form of fiber material is embedded.

By the invention, it is achieved that a spectacle frame or a member of a spectacle frame can be manufactured using composite materials while still allowing the frame or the member to be adjusted. The frame or the member can readily be e.g. shaped, adjusted as regards the curvature etc. by forcing the member to take the desired shape, and the metal core part will counteract the composite materials natural tendency to return to the initial shape, whereby the frame or the member will remain in the desired shape.

Thus, the highly desirable properties of the composite materials, e.g. high strength, can be taken advantage of while still making it possible to form or adjust the shape or form of the at least one member of the spectacle frame without any risk of the composite material being subjected to breakage, delaminating, fibre pull-out and/or decomposing.

Furthermore, it is achieved that the members of the spectacle frame can be manufactured using composite material techniques and processes, which in itself provides a number of added advantages as regards manufacturing cost, speed and precision as well as regards design options, low weight, etc.

It is noted that for the purpose of this application and in accordance with commonly used terminology within the field of moulded materials and processes, the term composite material is understood as being materials, which comprises a matrix material and reinforcement materials, where the reinforcement materials in the form of fiber materials are embedded in the matrix material. The matrix material surrounds and supports the reinforcement materials by maintaining their relative positions.

Furthermore, by the invention it is achieved that spectacle frames and spectacle frame members may be provided in a multitude of forms, shapes, designs, etc., of which many have hitherto not been feasible. For example, spectacle members may be configured in very thin embodiments, e.g. with dimensions as thin as 1.0 mm or even thinner, while still providing the necessary strength, stiffness, durability, etc., which would not have been possible using the commonly used prior art techniques.

Preferably, as specified in claim 2, said at least one member may be an essentially elongated member such as a side member or a browbar and wherein said metal core part may extend essentially along the length of said essentially elongated member.

Hereby, it is achieved that the parts or members that normally needs to be adjusted, e.g. the browbar or the side members, can readily be adjusted by simply forcing the member into the desired shape.

However, it will be understood that spectacle frame members other than elongated members may be provided with a metallic core part in accordance with the invention, for example lense rim parts etc., and that such core parts may be connected to each other.

Advantageously, as specified in claim 3, said metal core part may have an essentially uniform sectional form along its length. Hereby, the metal core part can be provided in a readily available form that may be cut to the desired length and used for the manufacturing of the relevant parts, which furthermore will simplify the manufacturing process and reduce the costs.

According to further preferable embodiments, as specified in claim 4, said metal core part may be in the form of a wire, a square-bar, a part cut from sheet metal or the like.

According to a particular embodiment, as specified in claim 5, said metal core part may have an initial form corresponding essentially to the form of said at least one member.

Hereby, the metal core parts may be provided in a form, where it prior to the manufacture has been e.g. shaped to a form, for example to the form of a side member including the shape of the end piece formed to rest and go behind the wearer's ear.

According to further advantageous embodiments, as specified in claim 6, said metal core part may comprise metal selected from the group consisting of stainless steel, aluminum, titanium, magnesium, copper, brass and combinations hereof.

Hereby, it is achieved that the metal core part has desired mechanical properties, e.g. strength, that allows the core part to be shaped and remain in the desired shape despite the tendency of the surrounding moulded composite part to return to the initial shape. Furthermore, these metals allow a suitable bond to be established and maintained between the core part and the composite material.

In accordance with a further advantageous embodiment, as specified in claim 7, said metal core part may comprise or may be connected to further functional elements such as e.g. hinge parts, etc.

Hereby, it is achieved that the shape- and/or curvature-maintaining metal core part or parts may serve the additional function of providing connection to such further elements, such as for example hinge means, whereby mechanical properties may be enhanced, manufacturing costs may be reduced and further flexibility may be added to the manufacturing process.

Advantageously, as specified in claim 8, said composite material may comprise reinforcement material selected from the group consisting of carbon fibres, glass fibres, Kevlar® fibres, synthetic fibres in general and organic fibres.

According to further advantageous embodiments, as specified in claim 9, said composite material may comprise matrix material, which is cured through a chemical reaction.

Hereby, spectacle frames and spectacle frame members can be provided in an advantageous manner while taking advantage of the options that are provided when using such resin or plastic materials and the corresponding manufacturing processes.

BRIEF DESCRIPTION OF THE FIGURES

The invention will be explained in further detail below with reference to the figures of which

DETAILED DESCRIPTION

Figure 1:
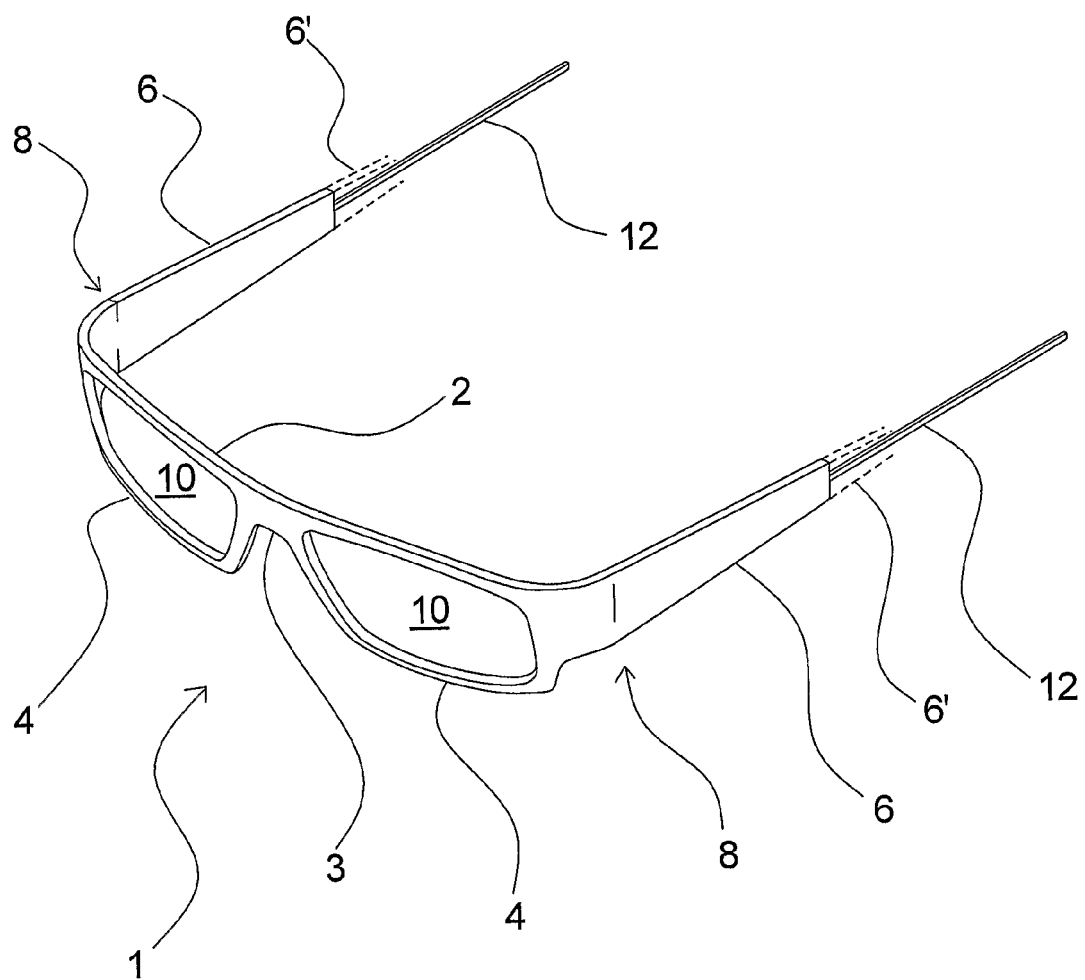
FIG. 1 shows an example of a spectacle frame 1 in a perspective view, illustrating an embodiment of the invention.

In FIG. 1 an example of a spectacle frame 1 is shown in a perspective view. It will be understood from the following that the invention can find use in connection with a wide variety of spectacles, spectacle frames and parts hereof and that the frame shown in FIG. 1 serves for illustrative purposes only.

The illustrated example of a spectacle frame 1 comprises a browbar 2 with a bridge 3 and rim or periphery frame parts 4 for accommodating spectacle lenses or glasses at the locations 10. Furthermore, the spectacle frame 1 comprises side members or side bars 3, which are only partly illustrated in FIG. 1 and which may be connected to the browbar 2 via hinge means 8 as indicated in FIG. 1. It will be understood that the side members 3 at their free end are designed in order to rest on and/or behind the ears of the user. Furthermore, it will be understood that the spectacle frame 1 may comprise further parts such as nose pads etc. and may be equipped with spectacle lenses or glasses for different purposes, with different focal properties etc., with different cosmetic, optical or therapeutic effects and/or in other different variations, which will be apparent to a skilled person within the field.

Even further, it will be understood that the spectacle frame 1 may be designed as a more or less frameless part, for example without rim or periphery parts 4 for holding the lenses, when other arrangements are provided for e.g. connecting the lenses to the browbar 2, to the bridge 3 and/or to the hinge means 8/side members 6.

In accordance with the invention, one or more of the parts of the spectacle frame 1 is/are made of a moulded composite material and comprises a metallic core member 12, such as illustrated for the side members 6 in FIG. 1. As shown, the overall structure of the side members 6 is shown at the end hingedly connected to the browbar 2, while at the other end the metallic core part 12 is shown in full lines and the outline 6' of the side member is shown with punctuated lines.

Figure 2:
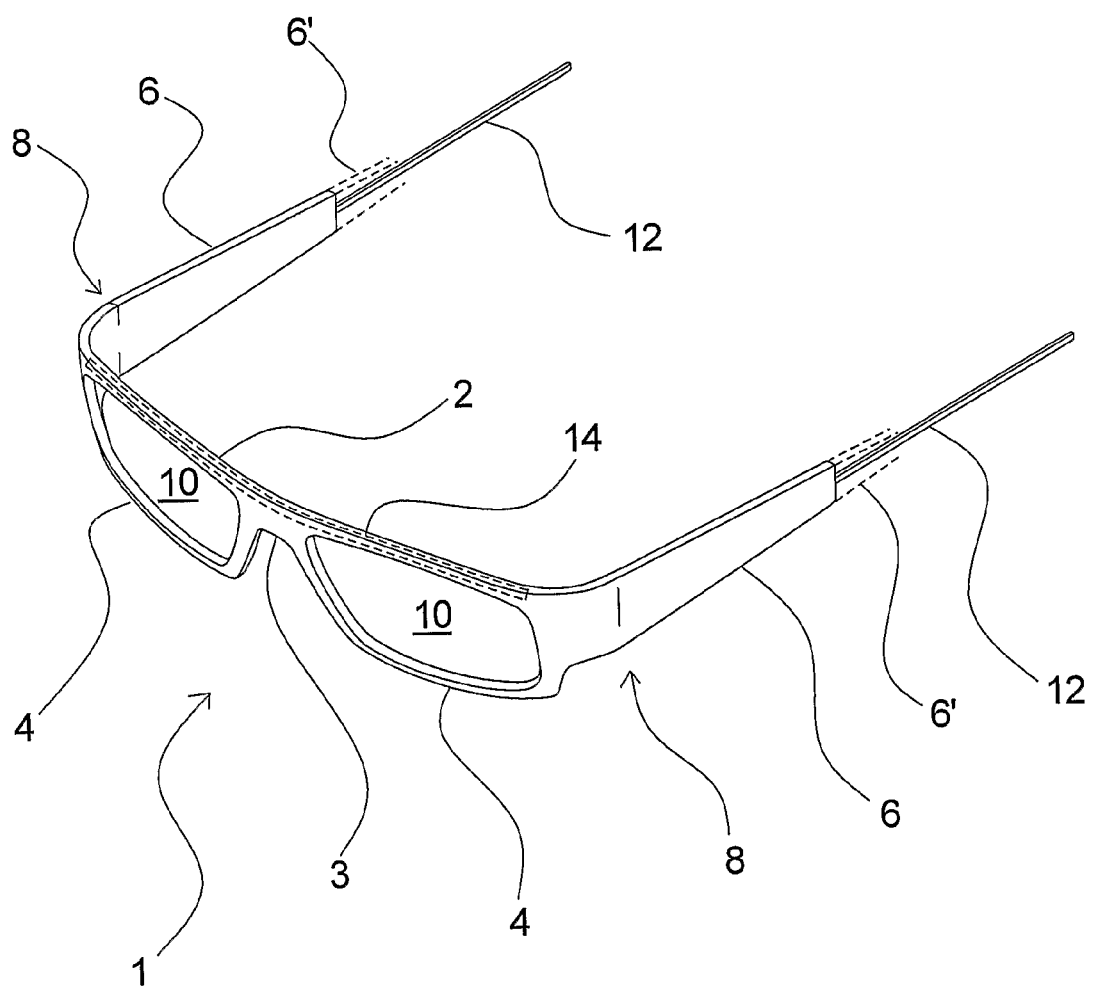
FIGS. 2 and 3 show further examples of a spectacle frame corresponding to FIG. 1, but illustrating further embodiments of the invention.

FIG. 2 corresponds to FIG. 1, but in FIG. 2 it is illustrated that a metallic core part 14 is embedded in the browbar 2. Further, such metallic core parts (not shown) may be placed in the interior of other parts of the spectacle frame 1, for example in the rim parts 4, if found necessary or expedient, and that such core parts may be connected to each other. Further, it will be apparent that such metallic core parts are formed in accordance with the relevant spectacle frame parts.

Figure 3:
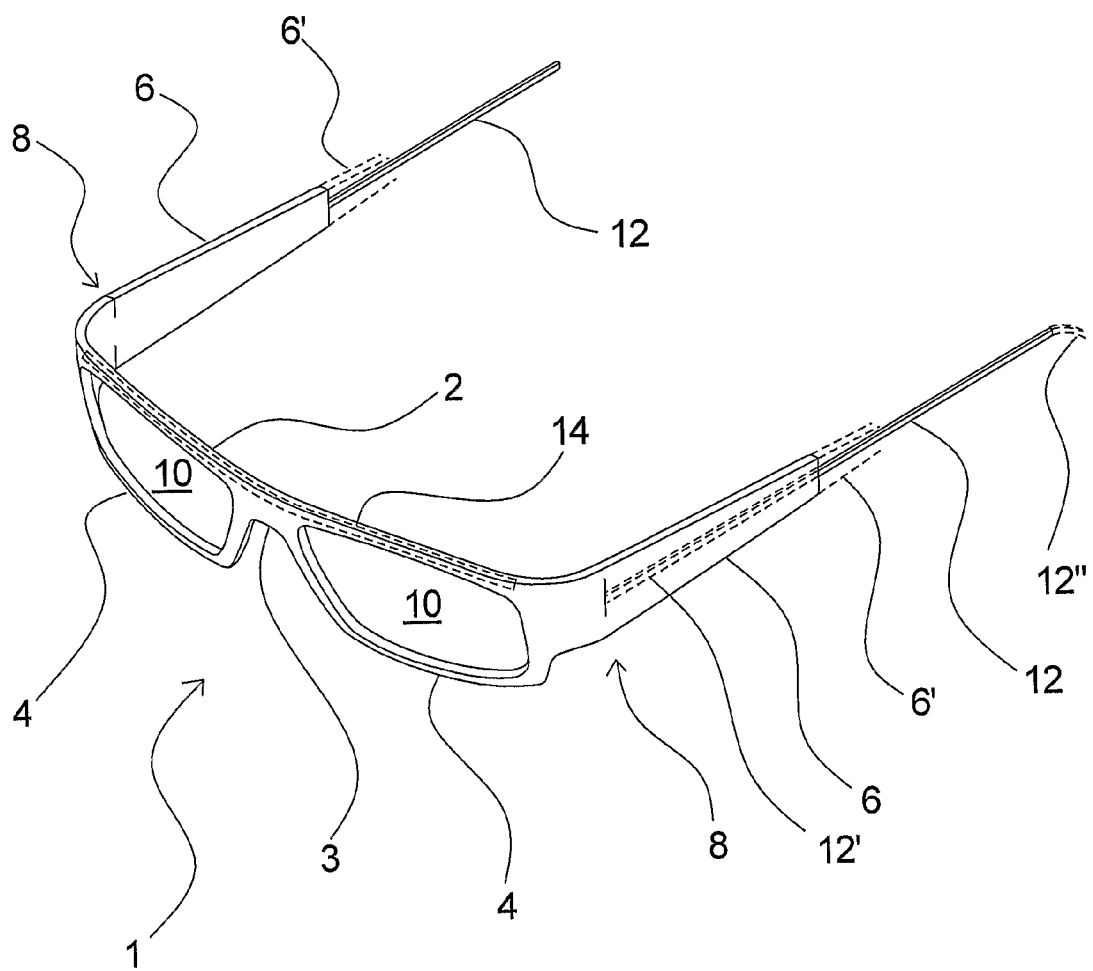

In the corresponding FIG. 3 it is illustrated for one of the side members 6 that the metallic core part 12 extends as indicated by the reference number 12' to the hinge end of the side member 6, where it even may serve as connecting point for a part of a hinge. It will be understood, though, that the metallic core part 12 need not have the same length as the member, in which it is embedded, as longs as it has a length that is sufficient to ensure that the member maintains its shape, curvature etc. in spite of the tendency of the moulded part to return to its initial shape, curvature etc.

Furthermore, in FIG. 3 it has been indicated for one of the side members 6 that at the free end the metallic core part 12 may possibly be extended to be embedded in an ear resting part, e.g. an ear hook, of the side member as indicated at 12".

Figure 4:
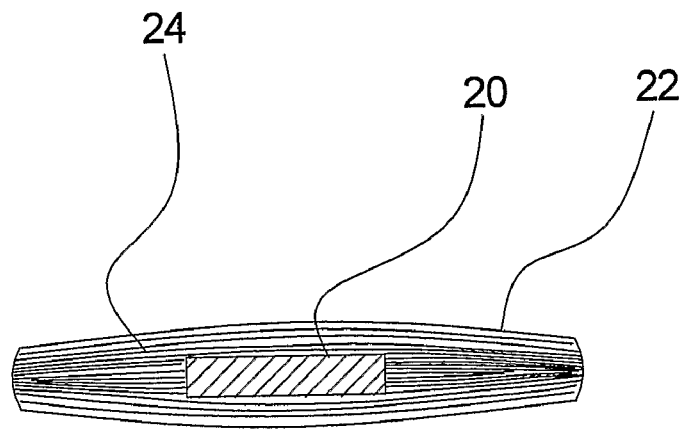
FIGS. 4 and 5 show sectional views of a spectacle frame member according to still further embodiments of the invention.

In FIG. 4 a sectional view of a member 22 or component of a spectacle frame is shown. The spectacle frame member 22 may for example be a side member 6, but it will be apparent that it can be any other member, for example a browbar, and that the sectional view will correspond to the actual member and may have any outer form that is suitable and/or desired for the actual member 22. In essence, the sectional view shows the metallic core part 20 that is shown located essentially in a central location of the member 22, but it will be understood that the metallic core part 20 may be located closer to one side or edge than the other. Further, it is noted that even though the metallic core part 20 is shown as having a square-bar shape, many other shapes may be used, for example circular shapes (wire-shapes), oval, triangular etc. Even further, it is noted that the size and/or the shape of the section of the metal core part 20 may be uniform along the its length or the size and/or the shape may be varied along the length, e.g. in order to reflect the size and/or shape of the actual member, in which the metal core part is embedded. The metallic core part 20 may be a part cut from sheet metal, for example using laser cutting or other cutting processes, whereby various shapes may be produced, for example also core parts corresponding to the outline or shape of e.g. a rim part 4 or for example a main part of a spectacle frame, e.g. the rim parts 4 connected to the browbar 2, etc.

A variety of metals may be used for the metallic core part 22 and it will be understood that the metal may be chosen in consideration of a number of properties, for example the tendency to maintain a shape, into which it has been formed by force, the strength of the metal, the resistance to corrosion, the weight in relation to the strength, the ability to maintain a bond to the surrounding moulded part, the cost, etc. In particular, stainless steel, aluminum, titanium, magnesium are seen as preferable metals for use as metallic core part, but also metals such as copper and brass may preferably be used and it will be understood that other metals and/or alloys may be used as well.

The moulded part 24 shown in FIG. 4 is as described above a composite material part, i.e. comprising a matrix material and a reinforcement material. It will be apparent to a skilled person that such materials can be selected from a large number of materials and that the reinforcement material can be selected in a wide variety of forms, e.g. as short fibres, continuous fibres, woven material, tape material, pre-preg material, etc., for example comprising material such as carbon fibres, glass fibres, Kevlar® fibres, synthetic fibres in general and organic fibres such as for example flax fibres, hemp fibres, cotton fibres, jute fibres, hair fibres, etc. Further, the illustration of the reinforcement material as layers in FIG. 4 is a schematic illustration only and does not preclude the use of reinforcement material in any suitable form in accordance with the invention. Similar apply for the direction(s) of the layers shown in FIG. 4.

As regards the composite material it will as mentioned above be apparent to a skilled person that such materials can be selected from a large number of materials and that the manufacture of the spectacle frame members can take place using a variety of manufacturing processes normally used within this field of technology.

In accordance with a particular embodiment of the invention the composite material may be a thermosetting resin or plastic that is cured through the addition of heat, through a chemical reaction, through irradiation, etc.

Figure 5:
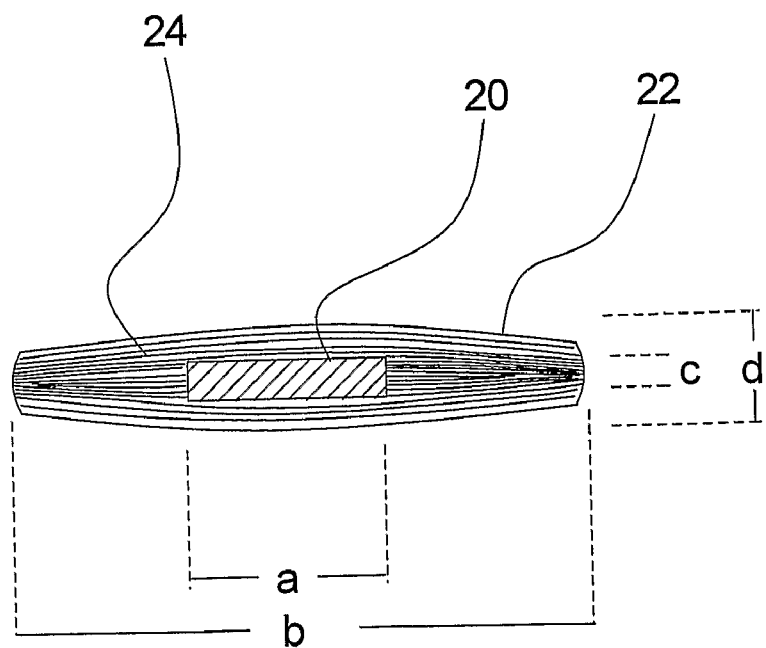

As indicated in FIG. 5, which essentially corresponds to FIG. 4, the dimension of the metallic core part 20 may be determined in view of the dimension of the spectacle frame member 22 or rather the moulded part 24 in order to ensure that the metallic core part will maintain the spectacle frame member 22 in the new shape, into which it has been adjusted, in spite of the tendency of the moulded part 24 to return to the initial shape. It will be apparent to the skilled person that preferable ratios between the dimensions b and a and/or the dimensions d and c may depend on the metal used, the composite material used, whether or not it is intended to adjust the shape of the member 22 in a particular direction, the actual form of the metallic core part (wire-shaped, square-bar-shaped, cut from sheet metal, etc.), etc.

A further example of a spectacle frame 1 according to an embodiment of the invention is shown in FIGS. 6-9. This spectacle frame 1 corresponds essentially to the frame described in connection with FIGS. 1-3, and e.g. the browbar 2 and/or the side members 6 of the frame may be manufactured essentially as described in connection with FIGS. 4 and 5, i.e. composed of an interior metal part also referred to as a metal core part, which is surrounded at least partially by a moulded part comprising composite material. The composite material is as also mentioned above a material, which comprises a matrix material and reinforcement materials, where the reinforcement materials in the form of fiber materials are embedded in the matrix material and where the matrix material surrounds and supports the reinforcement materials by maintaining their relative positions.

As the spectacle frame shown in FIGS. 6-9 in many aspects corresponds to the previously described spectacle frame and since the same reference numbers has been used for the same or analogous components, the general features of the spectacle frame 1 shown in these figures will not be described further. However, it shall be mentioned that hinge means 8 have been illustrated in detail in FIGS. 6, 7 and 8, including fastening means 36, e.g. screws or the like, for connecting the hinge means 36 to the browbar 2 and the side members 6. As mentioned above, the hinge means 8 may be connected to the spectacle components at locations, where the metal core part is located, whereby the fastening means 36 may establish a connection also to the metal core part.

Figure 6:
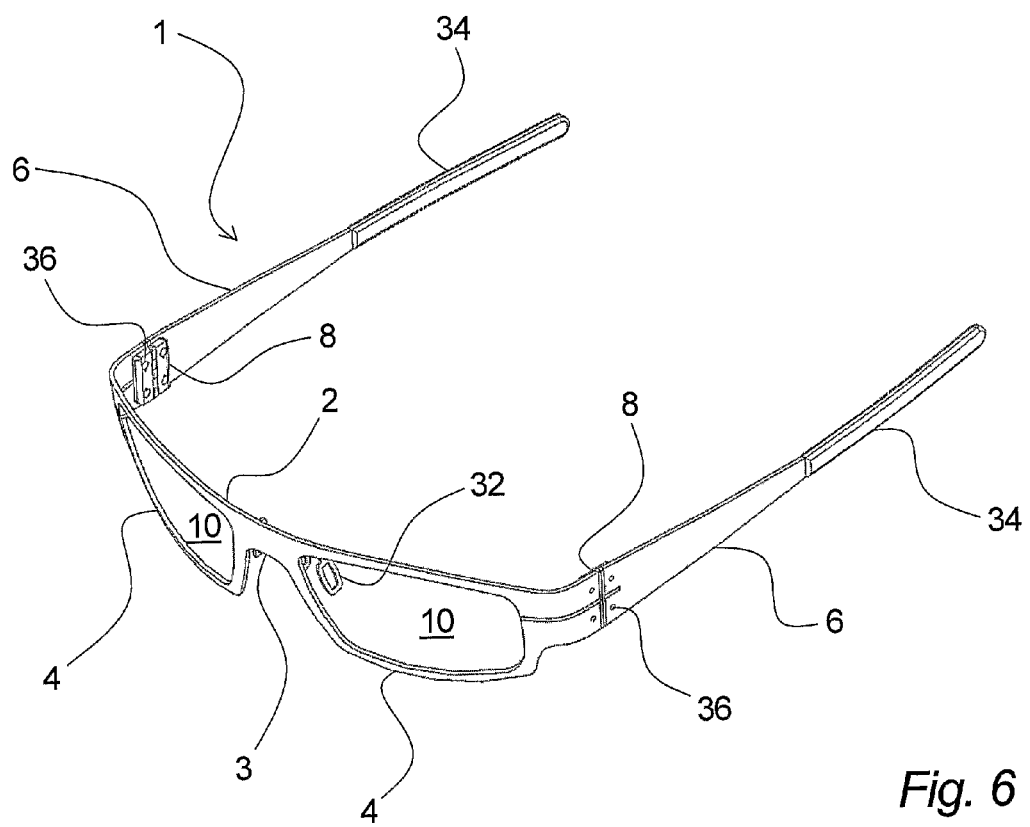
FIG. 6 shows a further example of a spectacle frame according to an embodiment of the invention in a perspective view.
Figure 7:
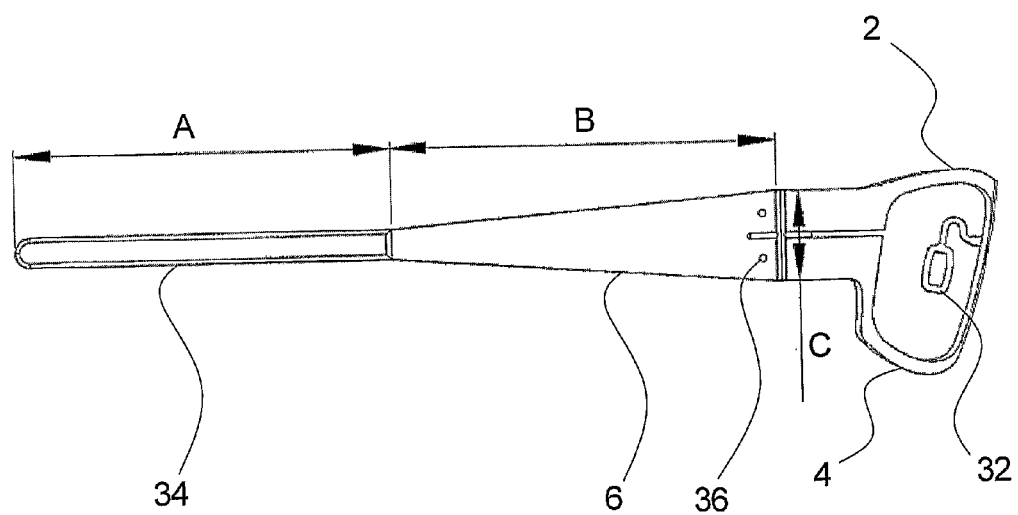
FIG. 7 shows the spectacle frame shown in FIG. 5 in a side view.
Figure 8:
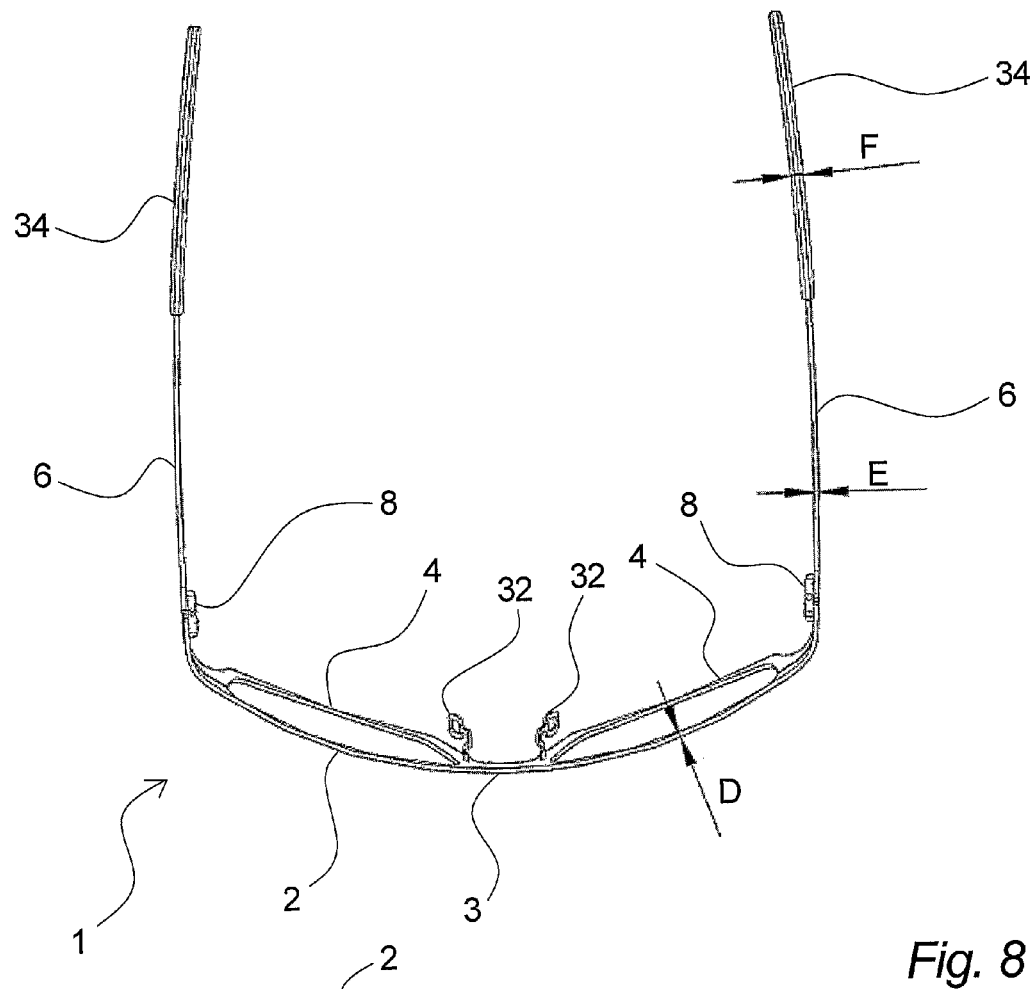
FIG. 8 shows the spectacle frame shown in FIG. 5 seen from above.

Also, nose pad parts 32 are illustrated in FIGS. 6, 7 and 8, which may e.g. be integral parts of the browbar 2 or which may be separate components connected to the browbar 2. It will be apparent to the skilled person that such parts may be designed in numerous varieties as regards e.g. form, shape, material etc. Such nose pad parts 32 may also be manufactured in accordance with the invention, e.g. consisting of a metal interior part surrounded at least partially by a moulded part, which comprises a composite material in accordance with the invention.

In FIGS. 6, 7 and 8 it is also shown that the side members 6 may be configured with a rear part 34, which e.g. for the purpose of serving as a an ear resting piece may have a larger dimension in the transverse direction. It will be understood that a separate part may be placed on this part of the side members 6, for example a separate part manufactured, e.g. moulded from a softer material, but it will also be understood that the rear part 34 may be an integral part of the side members 6 and may be manufactured during the same work process as the side members. Thus, the larger dimension may be due to an added amount of composite material at the specific locations and/or due to a larger dimension of the metal core part.

Examples of dimensions for a spectacle frame according to this example of the invention are indicated in FIGS. 6-8 by the references A-G. It will naturally be understood that e.g. general dimensions may be dependent on the user and that only certain dimensions will be referred to in order to further illustrate the invention.

As shown in FIG. 7, the side bar or side member 6 may essentially have a first part having a length B and a second part, i.e. the rear part 34 having a length A, where A and B are essentially equal, but it will be apparent that other relative lengths are possible. Also, FIG. 7 illustrates the height C of the browbar 2 at the hinge location, where for example C may be app. 15 mm, but it will be apparent that C may be more or less than 15 mm.

Figure 9:
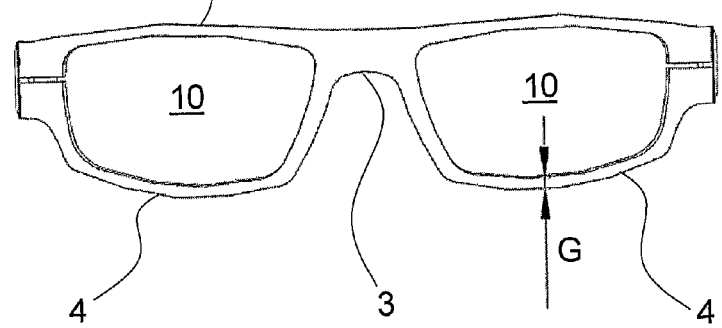
FIG. 9 shows the spectacle frame shown in FIG. 5 in a front view.

Of particular importance is the dimensions D, E and F shown in FIG. 8, i.e. transverse dimensions for members of the spectacle frame 1. The spectacle frame may be manufactured having dimensions D and E that may be approximately 1.0 mm or less, e.g. approximately 0.9 mm, 0.8 mm, 0.7 mm or even smaller, e.g. even as small as approximately 0.5 mm, even though it will be understood that larger dimensions, e.g. approximately 1.1 mm, 1.2 mm, etc. or more, also are possible. The transverse dimension F of the rear part 34 of the side member 6 may be approximately 2.6 mm or smaller, even though it will be understood that a larger dimension also will be possible. As shown in FIG. 9, the rim parts 4, which also may have a transverse dimension of approximately 1.0 mm or less, e.g. 0.9, mm, 0.8 mm, etc., may for example have a height of approximately 2.25 mm. As mentioned, these dimensions are only examples, but examples that illustrates that a spectacle frame in accordance with the invention may be designed with very thin members and components while still having the necessary strength to e.g. hold the glasses and maintain the shape during everyday use. Thus, by the invention, it is also possible to design a spectacle frame with a desirable low weight, which is advantageous to the user, while still maintaining a necessary sturdiness, robustness, flexibility, etc. Also, the invention allows the spectacle frame to be designed in numerous manners, shapes and forms, including designs having relatively thin members and components, which otherwise would not have been feasible.

The invention has been exemplified above with reference to specific examples. However, it should be understood that the invention is not limited to the particular examples described above but may be used in connection with a wide variety of applications. Further, it should be understood that the device according to the invention may be designed in a multitude of varieties within the scope of the invention as specified in the claims.

The invention claimed is:

1. A spectacle frame comprising:
   at least one member, which at least one member comprises a metal core part and a moulded part, wherein:
   said metal core part is an interior part of said at least one member and said moulded part comprises a composite material, said composite material comprising a matrix material and reinforcement material embedded in said matrix material and wherein
   said matrix material comprises a thermosetting resin that is cured through addition of heat, through a chemical reaction or through irradiation.

2. Spectacle frame according to claim 1, wherein said at least one member is an essentially elongated member and wherein said metal core part extends essentially along the length of said essentially elongated member.

3. Spectacle frame according to claim 2, wherein said essentially elongated member is a side member.

4. Spectacle frame according to claim 2, wherein said essentially elongated member is a browbar.

5. Spectacle frame according to claim 1, wherein said metal core part comprises or is connected to a further functional element.

6. Spectacle frame according to claim 1, wherein said metal core part has an essentially uniform sectional form along a length.

7. Spectacle frame according to claim 1, wherein said metal core part is in a form of a wire, a square-bar or a part cut from sheet metal.

8. Spectacle frame according to claim 1, wherein said metal core part has an initial form corresponding essentially to a form of said at least one member.

9. Spectacle frame according to claim 1, wherein said metal core part comprises metal selected from the group consisting of stainless steel, aluminum, titanium, magnesium, copper, brass and combinations hereof.

10. Spectacle frame according to claim 5, wherein said further functional element is a hinge part.

11. Spectacle frame according to claim 1, wherein said composite material comprises reinforcement material selected from the group consisting of carbon fibres, glass fibres, Kevlar® fibres, synthetic fibres and organic fibres.

* * * * *